United States Patent [19]

Hults

[11] 3,784,972
[45] Jan. 8, 1974

[54] SEAT BELT SYSTEM

[76] Inventor: Arthur E. Hults, 11019 Reichling Ln., Whittier, Calif. 90606

[22] Filed: Jan. 24, 1972

[21] Appl. No.: 220,254

[52] U.S. Cl. ............ 340/52 E, 307/10 SB, 180/82 C
[51] Int. Cl. ............................................. B60r 21/10
[58] Field of Search ......................... 340/52 E, 278; 307/10 SB; 180/82 C

[56] References Cited
UNITED STATES PATENTS
| | | | |
|---|---|---|---|
| 3,074,055 | 1/1963 | Rudolph et al. | 340/52 E X |
| 3,381,268 | 4/1968 | Boblitz | 340/278 X |
| 3,449,714 | 6/1969 | Farley, Jr. | 340/278 X |

Primary Examiner—Alvin H. Waring
Attorney—Ford W. Harris, Jr. et al.

[57] ABSTRACT

A vehicle seat belt system for use in automobiles, buses, airplanes, boats and the like. A seat system responsive to the occupancy of a seat by a passenger and use of the seat belt for that seat. A switch system actuated by said seat system. A signal system controlled by the switch system for signaling non-use of a seat belt of an occupied seat. A vehicle power system controlled by the switch system. The vehicle power system being inoperative when the seat belt of an occupied seat is not in use. A delay cut-off switch in said switch system which delays for a predetermined time interval the rendering of the vehicle power system inoperative when a seat belt is disengaged during operation of the vehicle.

6 Claims, 4 Drawing Figures

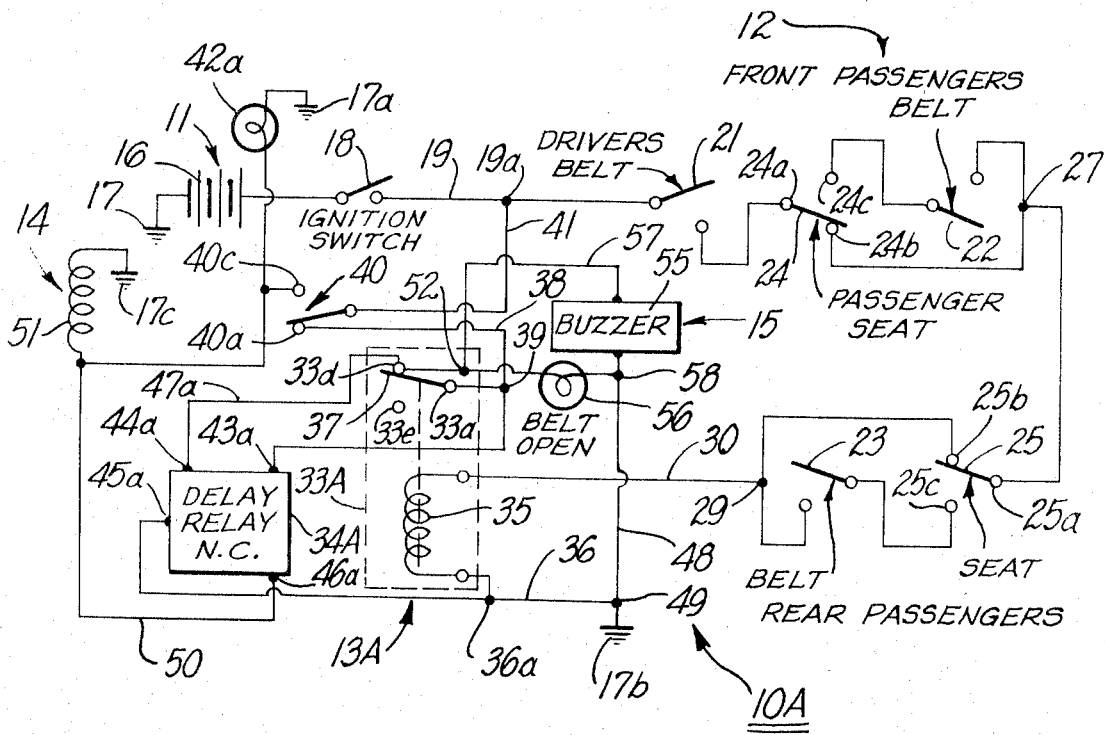

3,784,972

SEAT BELT SYSTEM

BACKGROUND OF THE INVENTION

The present invention is directed to a vehicle seat belt system that signals when the seat belt of an occupied seat is disengaged. More particularly, the invention is directed to a seat belt system that controls the vehicle's power system and prevents movement of the vehicle from a standstill and deactivates the power system after a predetermined delay when the vehicle is in motion upon the disengagement of a seat belt for an occupied seat.

Although the safety virtues of vehicle seat belts are well known and well advertised, and most, if not all, past 1965 automobiles are equipped with seat belts, there is evidence that less than half the drivers and passengers of vehicles use them. Safety committees have advocated legislation making the non-use of available seat belts a ground of contributory negligence in vehicle accident suits and auto companies have installed flashing signals reading "SEAT BELTS" or the like on automobile dashboards to no avail. The automobile safety experts have come to realize that availability, eduction, warning signals and threatened punitive legislation are not enough to comple the majority of people to use seat belts.

SUMMARY OF THE INVENTION

A seat belt system having an electrical source, a seat system, a switch system and a signal system. The switch system being electrically actuated by actuating means. The seat system having a driver's seat belt switch which is responsive to use and non-use of the seat belt. The driver's seat belt switch connecting the actuating means to the electrical source when the seat belt is in use. The switch system connecting the signal system to the electrical system when the actuating means is not electrically energized.

Said seat system optionally containing one or more passenger seat circuits. The passenger seat circuit having a seat switch which is responsive to occupancy of the seat and a passenger seat belt switch which is responsive to use of the passenger seat belt. The seat switch electrically connects the driver seat belt switch to the actuating means when the passenger seat is unoccupied and it electrically connects the driver seat belt switch to the passenger seat belt switch when the seat is occupied. The passenger seat belt switch being electrically connected with the actuating means when the passenger seat belt is in use. In addition said seat belt system optionally includes a vehicle power system which requires electrical energy to operate. The switch system electrically connects the power system to the electrical source when the actuating means is electrically energized. In another embodiment, the seat belt system includes a delay cut-off switch having electrically powered control means. The switch system electrically connecting the control means to the electrical source when the actuating means is electrically energized. The cut-off switch electrically connecting the power system to the electrical source when the control means is electrically energized. The cut-off switch breaking the electrical connection between the power system and the electrical source after a predetermined time interval following the de-energization of the control means.

DESCRIPTION OF THE DRAWINGS

FIG. 4 is an electrical diagram of a seat belt incorporating another embodiment of the present invention.

DESCRIPTION OF THE INVENTION

Figure 1:
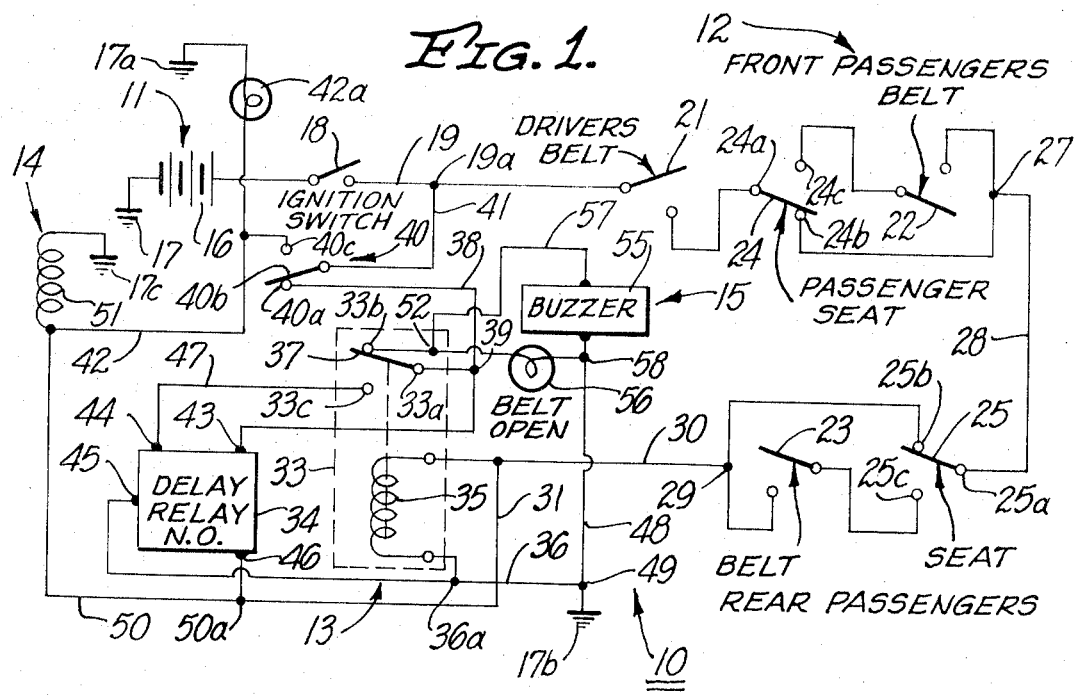
FIG. 1 is an electrical diagram of a seat belt system incorporating the preferred embodiment of the present invention.

Referring to FIG. 1, the invention, a seat belt system 10 includes an electrical power source 11, a seat system 12, a switch system 13, a vehicle power system 14 and a signal system 15.

The power source 11 includes a battery 16. One side of the battery 16 is connected to a common ground 17 which is normally the metal frame or body of the vehicle (not shown). The other side of the battery is connected to one side of an ignition switch 18. The other side of switch 18 is connected to the seat belt system 12 via lead 19.

The seat belt system 12 includes seat belt switches 21, 22 and 23 and seat switches 24 and 25. The lead 19 is electrically connected to one end of the driver's seat belt switch 21 which, as are switches 22 and 23, is equivalent to a single pole switch. The switch 21 is connected to the driver's seat belt (not shown) and is open when the belt is not in use and is closed when the belt is in use. The other side of switch 21 is connected to an input pole 24a of the front passenger seat switch 24, which is, as is switch 25, equivalent to a single pole double throw switch. The switch 24 is connected to the front passenger seat (not shown) and is responsive to the occupancy state of the seat. When the seat is unoccupied, the switch is as illustrated in FIG. 1. A pole 24b of switch 24 is electrically connected to a terminal 27. Another pole 24c of switch 24 is electrically connected to one side of a passenger seat belt switch 22. The switch 22 is connected to the front passenger seat belt (not shown) and is responsive to the use of the belt. The other side of switch 22 is electrically connected to terminal 17 which is electrically connected to a rear passenger seat switch 25 via a lead 28 and an input terminal 25a. A pole 25b of the switch 25 is electrically connected to a terminal 29 and another pole 25c is connected to one side of the rear passenger seat switch 23. The other side of switch 23 is electrically connected to the terminal 29 which is connected to the switch system 13 by lead 30. Switches 25 and 23 are similar in operation to switches 24 and 22 respectively.

The switch system 13 includes a magnetic relay switch 33 and a delay action switch 34. Lead 30 is electrically connected to one side of a solenoid coil 35 of switch 33; the other side of coil 35 is electrically connected to a lead 36 at a terminal 36a. The coil 35 drives one end of a switch bar 37 from contact with a pole 33b to a pole 33c; a spring means (not shown) biases bar 37 to make contact with pole 33b. The other end of bar 37 is electrically connected to pole 33a which is electrically connected to a lead 38 at a terminal 39. One end of lead 38 is electrically connected to a pole 40a of an emergency short-out switch 40. The switch 40 has a switch bar 40b which is connected to the lead 19 via a lead 41 at a terminal 19a. The switch 40 has a second pole 40c which is electrically connected to a lead 42. One end of lead 42 is connected to a lead 50 and the other end is connected to one side of a lamp 42a. The other side of the lamp 42a is connected to a common ground 17a. The other end of lead 38 is electrically connected to an input terminal 43 of the switch 34 which also has a control input terminal 44, a control ground terminal 45 and an output terminal 46.

The delay relay switch 34, which is normally open between terminals 43 and 46, is an electrically actuated switch which closes the circuit between terminals 43 and 46 when current flows through the switch control apparatus (not shown) via terminals 44 and 45. When the current flow to the control apparatus is interrupted, the switch control opens the circuit between terminals 43 and 46 after a predetermined time interval. Any conventional delay relay switch can be employed, such as the Amperite Thermostatic Delay Relay, sold by the Amperite Co., Inc., 600 Palisade Ave., Union City, N. J. 07087, and described in the Amperite Bulletin No. TR-81.

Pole 33c is electrically connected to terminal 44 via lead 47. The terminal 45 is electrically connected to a ground lead 48 via lead 36 at a terminal 49. One end of lead 48 is connected to a common ground 17b. The vehicle power system 14 is electrically connected to the switch 34 by the lead 50 at terminal 46. The lead 30 is electrically shorted to lead 50 at terminal 50a via a lead 31. The vehicle power system illustrated includes an ignition coil 51 which is electrically connected to lead 50 and a common ground 17c. The pole 33b is electrically connected to the signal system 15 at a terminal 52.

The signal system 15 includes an electrically powered buzzer 55 and an electric light 56. One side of the buzzer 55 is electrically connected to terminal 52 via lead 57 and the other side is electrically connected to lead 48 which in turn is electrically connected to lead 48 which in turn is electrically connected to ground 17a. The light 56 is electrically connected on one side to lead 48 at terminal 58 and on the other side to the terminal 52.

The seat belt system illustrated in FIG. 4 is similar in many respects to the system illustrated in FIG. 1, and elements common to both systems are identified with the same numerals. Referring to FIG. 4, the invention, a seat belt system 10 includes an electrical power source 11, a seat system 12, a switch system 13A, a vehicle power system (electrical ignition system) 14 and a signal system 15.

The seat system 12, described above, includes seat belt switches 21, 22 and 23 and seat switches 24 and 25 and is connected to the switch system 13A via lead 30.

The power source 11 is connected to the seat system 12 as described above.

The switch system 13A includes a magnetic relay switch 33A and a delay action switch 34A. Lead 30 is electrically connected to one side of a solenoid coil 35 of switch 33A; the other side of coil 35 is electrically connected to a lead 36 at a terminal 36a. The coil 35 drives one end of switch bar 37 away from electrical contact with a pole 33d to a pole 33e; a spring means (not shown) biases bar 37 to make contact with pole 33d. The other end of bar 37 is electrically connected to pole 33a which is electrically connected to a lead 38 at a terminal 39. One end of lead 38 is electrically connected to lead 19 at terminal 19b via switch 40 and lead 41; the other end of lead 38 is electrically connected to input terminal 43a of the switch 34A which also has a control input terminal 44a, a control ground terminal 45a and an output terminal 46a. The switch 40 can be electrically connected to the power system 14 and the lamp 42a as described above.

The delay relay switch 34A, which is normally closed between terminals 43a and 46a, is an electrically actuated switch which opens the circuit between terminals 43a and 46a when current flows through the switch control apparatus (not shown) via terminals 44a and 45a. When the current flow to the control apparatus is commenced, the switch control opens the circuit between terminals 43a and 46a after a predetermined time interval. Any conventional delay relay switch can be employed, such as the Amperite Thermostatic Delay Relay, sold by the Amperite Co., Inc., 600 Palisade Ave., Union City, N.J. 07087, and described in the Amperite Bulletin No. TR-81.

Pole 33d is electrically connected to terminal 44a via lead 47a. The terminal 45a is electrically connected to a ground lead 48 via the lead 36 at a terminal 49. The vehicle power system 14 is electrically connected to the terminal 46a by lead 50. The vehicle power system 14 includes an ignition coil 51, as described above. The pole 33d is also electrically connected to the signal system 15 at the terminal 52.

The signal system 15 includes an electrically powered buzzer 55 and an electric light 56 and is connected to the terminals 49 and 52, as described above.

Figure 2:
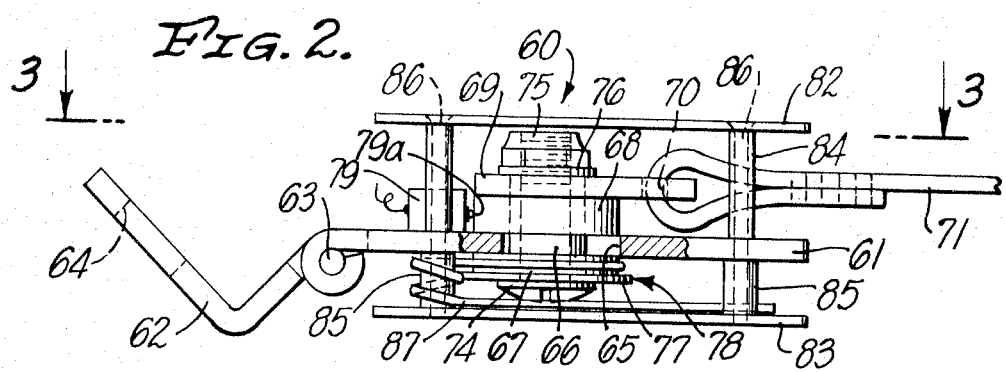
FIG. 2 is a sectional view of a seat belt strap anchor used in a seat belt system.
Figure 3:
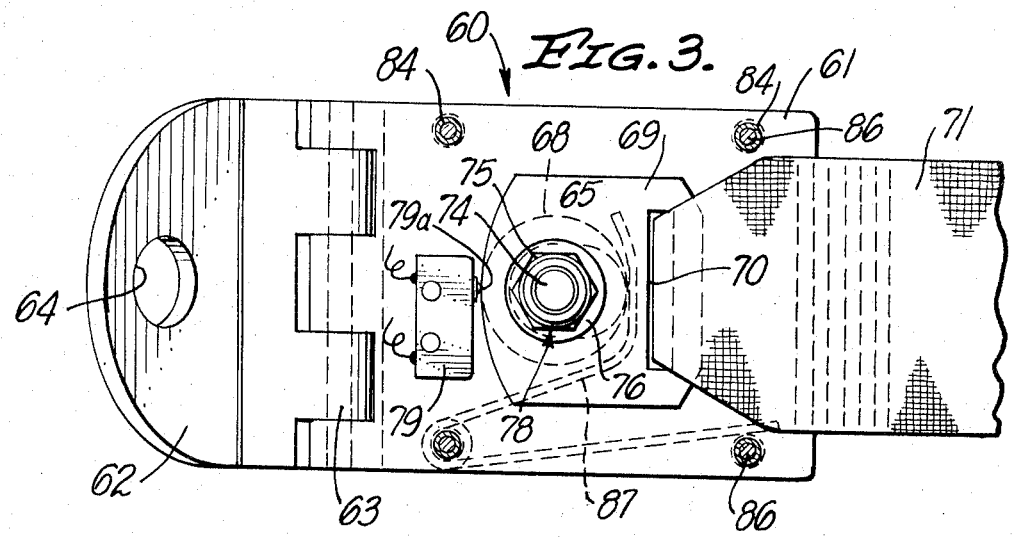
FIG. 3 is a cross-sectional view taken along line 3—3 of FIG. 2.

In FIG. 2, a seat belt anchor device 60 is illustrated. The anchor 60 has a frame 61 and an anchor plate 62 which are secured to one another for hinged movement by hinge assembly 63 (see FIG. 3). The plate 62 has an aperture 64 adapted to receive a bolt or rivet (not shown) for securing the anchor 60 to a vehicle. The frame 61 has an elongated aperture 65 which is adapted to receive a bushing 66 for sliding movement. First and second sleeves 67 and 68, respectively, are journaled on the bushing 66 above and below the frame 61. An attachment lug 69 is journaled on the bushing 66; the lug has a slit aperture 70 (see FIG. 3) through which the end of a seat belt strap 71 is passed, folded back and secured to the strap. A threaded bolt 74 and a threaded nut 75 secure the assembly of bushing 66, sleeves 67 and 68, and lug 69 between first and second washers 76 and 77, respectively (hereinafter referred to as the assembly 78). A switch 79 is mounted on the frame 61 so that sleeve 68 can engage and depress the switch lever 79a when the assembly 78 is slid toward the switch. First and second plates 82 and 83, respectively, are positioned above and below the frame 61 and secured thereto by hollow pillars 84 and 85 and threaded machine bolts 86 which pass through plate 82, pillar 84, frame 61 and pillar 85 and engage complementary threaded apertures in plate 83. A spring 87, having its middle portion spirally wound about one of the pillars 85, one end seated about the outer periphery of sleeve 67, and the other end engaging another pillar 85, biases the assembly toward the switch 79.

Operation of the Seat Belt System

The operation of the system 10 will first be described with a driver alone occupying the vehicle. If the driver fails to fasten his seat belt, the vehicle's power system will now operate when the ignition switch 18 is closed or turned on. When the driver's seat belt is not fastened, seat belt switch 21 remains open and prevents current from flowing through switch 21 to the coil 35 of switch 33 and to the vehicle power system 14 via lead 31, switch 34 and lead 50. In its unenergized state, that is, when the coil 35 is not electrified, switch 33 directs current starting from terminal 19a to the signal system 15 via lead 41, switch 40, bar 40b, pole 40a, lead 38, terminal 39, pole 33a, bar 37, pole 33b and terminal 52. The light 56 and buzzer 55 of the signal system, in the case of an automobile, will normally be in or under the dashboard to give the driver notice that his seat belt is not fastened. In its unenergized state, switch 33 does not direct current to the controls of switch 34 via terminal 44. When the controls of switch 34 are not electrified, the circuit between terminals 43 and 46 is open and no current passes to the vehicle power system 14 via the switch 34. In addition, the open switch 21 prevents current flow through the lead 30 and the lead 31 to the lead 50, thus rendering the system 14 inoperative.

When the driver fastens his seat belt, switch 21 closes and the vehicle power system is energized via lead 30, lead 31 and lead 50, and the solenoid coil 35 is electrified via switches 21 and 24, pole 24b, terminal 27, lead 28, switch 25, pole 25b, terminal 29 and lead 30. The electrified coil 35 throws or switches the bar 37 from contact with the pole 33b to contact with the pole 33c. The switching of poles cuts current flow to the signal system 15, and directs current to the controls of switch 34, starting from bar 37, through pole 33c lead 47, terminal 44, the control apparatus of switch 34, terminal 45, lead 36, terminal 49 and to the ground 17b. The energization of the controls of the switch 34 closes the circuit between terminals 43 and 46 and electrically connects the power system 14 with the electrical power source starting with terminal 46, through lead 50 to coil 51 permitting operation of the vehicle power system 14. When energized, conventional delay relay switches require a short period to close the circuit between terminals 43 and 46. Thus lead 31 provides that the power system 14 can be operated immediately without delay when switch 21 is closed.

If the driver unfastens his seat belt during the operation of the vehicle, the seat belt switch 21 opens and causes a power loss to lead 50 via lead 31 and to the switch system 13, whereupon solenoid switch 33 de-energizes and the biasing means of switch 33 causes bar 37 to switch from pole 33c to pole 33b. This switching energizes the signal system 15 as described above and furnishes a warning to the driver that his belt is unfastened. Simultaneously, the de-energization of switch 33 cuts the current flow to the control mechanism of switch 34. The switch control breaks of switches off the circuit between terminals 43 and 46 causing a power loss to the vehicle power system 14. In addition, there is no current flow from lead 30 via lead 31 and lead 50 to the system 14 rendering the system inoperative. For purposes of safety. the control mechanism of switch 34 delays breaking the circuit between terminals 43 and 46 for a predetermined period of time to keep vehicle power system energized in order to give the driver sufficient time to fasten his seat belt or bring the vehicle, in the case of an automobile, to a stop in a safe place outside of the flow of traffic. When the driver fastenes his belt, switch 21 closes, allowing the energization of switch system 13, as described above, which in turn causes the energization of switch 34, and the de-energization of the signal system 15.

When a passenger occupies a seat in the vehicle the operation of the various systems, except for the seat system 12, are not altered and function as described above. With respect to the seat system 12, when a passenger seat is occupied by a passenger, a switch, such as switch 24, is actuated causing the switch to break the circuit to pole 24b and close the circuit to pole 24c. If the passenger fails to fasten his seat belt, his seat belt switch 22 remains open and prevents current flow from seat switch 24, via pole 24c, to terminal 27 and on to the switch system 13 and vehicle power system 14 as described above. This in tur causes energization of the signal system 15 when the ignition switch 18 is closed. When the passenger seat belt is fastened, switch 22 closes allowing current flow to the vehicle power system 14 and the switch system 13, which in turn de-energizes the signal system 15 and permits the driver to operate the vehicle power system 14 as described above. If the vehicle is in operation when a passenger unfastens his seat belt, switch 22 opens and breaks the circuit or electrical connection between the electrical source 16 and the switch system 13 and the power system 14. This in turn causes the signal system 15 to be electrified and de-energizes the control of switch 34 as described above. If the passenger timely fastens his seat belt before switch 34 cuts off power to the vehicle power system 14, the operation of the vehicle will not be interrupted.

The rear passenger seat system works in the same manner as the front passenger seat. That is, when the rear seat is occupied, the switch 25 closes contact between the pole 25c and the lead 28 and breaks contact between the pole 25b and the lead 28. If the passenger fails to secure his seat belt, the switch 23 remains open and no current flows to the lead 30. When the passenger secures his belt, the switch 23 closes connecting the lead 30 to the battery 16 as described above.

Additional seat systems similar to the front and rear passenger seat systems described above can be added to circuits 10 and 10A (described below) in series.

The emergency switch 40 provides a means of operating the vehicle when a breakdown occurs in the system 10. When the bar 40b is switched to make contact with the pole 40c, the power system is connected to the ignition switch through lead 19, terminal 19a, lead 41, switch 40, and lead 42 to lead 50. The light 42c is also electrically connected to the ignition switch to give notice that emergency switch has been actuated.

The operation of the system 10A will first be described with a driver alone occupying the vehicle. If the driver fails to fasten his seat belt, the vehicle's power system will operate for a predetermined time only when the ignition switch 18 is closed. When the driver's seat belt is not fastened, seat belt switch 21 remains open and prevents current from flowing through switch 21 to the coil 35 of switch 33A and to the vehicle power system 14 via lead 38, switch 34A and lead 50. In its unenergized state, that is, when the coil 35 is not electrified, switch 33A directs current from terminal 19a through the signal system 15 via lead 41, switch 40, lead 38, terminal 39, pole 33a, bar 37, pole 33d and terminal 52. In its unenergized state, switch 33A also directs current to the controls of switch 34A via terminal 44a. When the controls of switch 34A are electrified, the circuit between terminals 43a and 46a is open and no current passes to the vehicle power system 14 via lead 50.

When the driver fastens his seat belt, switch 21 closes and the vehicle power system is energized via lead 38 terminals 43a and 46a and lead 50, and the solenoid coil 35 is electrified as described above. The electrified coil 35 throws the bar 37 so as to disengage it from contact with the pole 33d and cut the current flow to the signal system 15 and the current flow to the controls of switch 34A. The de-energization of the controls of the switch 34A closes the circuit between the terminals 43a and 46a and electrically connects the power system 14 with the electrical power source 11.

If the driver unfastens his seat belt during the operation of the vehicle, the seat belt switch 21 opens and causes a power loss to the switch system 13A, whereupon solenoid switch 33A de-energizes and the biasing means of switch 33 causes bar 37 to come in electrical contact with the pole 33d. This switching energizes the signal system 15 as described above and furnishes a warning to the driver that his belt is unfastened. Simultaneously, the de-energization of switch 33A electrically connects the power source 11 to the control mechanism of switch 34A which causes a break in the circuit between the terminals 43a and 46a and a resulting power loss to the vehicle power system 14. For purposes of safety, the control mechanism of switch 34A delays breaking the circuit between terminals 43a and 46a for a predetermined period of time to keep the vehicle power system 14 energized in order to give the driver sufficient time to fasten his seat belt or bring the vehicle, in the case of an automobile, to a stop in a safe place. When the driver fastens his belt, switch 21 closes, causing the energization of switch system 13a and the system 14 and the de-energization of the signal system 15 as described above.

The operation of circuit 10A with respect to the passenger seat switch system and the emergency switch 40 is identical to that described above for circuit 10.

The seat belt anchor device 60 has a switch mechanism responsive to fastening and unfastening of the belt and is ideally suited for use in the seat belt system 10. When the belt 71 is unfastened, the assembly 78 is biased toward the switch 79 by spring 87. The sleeve 66 engages and depresses switch lever 79a causing switch 79 to open. When the belt 71 is fastened, the belt pulls assembly 78 away from switch 79 and lever 79a causing the switch to close. The elongated aperture 65 is of sufficient length to eliminate inadvertent engagement of the switch lever 79a with assembly 78 when the seat belt 71 is fastened.

The invention is not limited to the embodiment described above. For example, the seat belt system may be comprised of a plurality of passenger seat systems each connected in series between the driver seat belt switch 21 and terminal 29. Seat belt anchor systems and switches other than anchor 60 may be employed in the invention. In addition, switch 33 can be a solenoid switch or the like and delay relay switch 34 can be any electrically powered switch that delays cut off after de-energization. Furthermore, lead 50 can energize components of the vehicle power system 14, other than the ignition coil 51, such as an electric fuel pump, transmission lock or brake, master battery switch or the like.

I claim:

1. In a seat belt system for a vehicle having a driver's seat with a fastenable driver's seat belt and having an electrical ignition system including an ignition switch, the combination of:
    a. first energizing means responsive to fastening of the driver's seat belt and to closure of the ignition switch for energizing the ignition system;
    b. first de-energizing means independent of the ignition switch and responsive to subsequent unfastening of the driver's seat belt, after energization of the ignition system, for de-energizing the ignition system; and
    c. time delay means for activating said first de-energizing means only after a predetermined time delay following unfastening of the driver's seat belt.

2. A seat belt system as defined in claim 1 wherein said first energizing and de-energizing means include a driver's seat belt switch in series with the ignition switch and closable upon fastening of the driver's seat belt.

3. A seat belt system according to claim 1 for a vehicle also having a passenger's seat with a fastenable passenger's seat belt, including:
    a. second energizing means responsive to the presence of a passenger in the passenger's seat and to fastening of the passenger's seat belt for activating said first energizing means if the driver's seat belt is fastened and the ignition switch is closed;
    b. second de-energizing means independent of the ignition switch and responsive to subsequent unfastening of the passenger's seat belt with a passenger in the passenger's seat, after energization of the ignition system, for activating said first de-energizing means to de-energize the ignition system; and
    c. said time delay means activating said first de-energizing means only after a predetermined time delay following unfastening of the passenger's seat belt.

4. A seat belt system as set forth in claim 3 wherein said second energizing and de-energizing means include a passenger seat switch responsive to the presence of a passenger in the passenger's seat and a passenger's seat belt switch closable upon fastening of the passenger's seat belt, said passenger seat switch including means for placing said passenger's seat belt switch in series with the ignition switch when a passenger is in the passenger's seat.

5. A seat belt system according to claim 1 including signal means for signalling that the driver's seat belt is unfastened.

6. A seat belt system as defined in claim 3 including signal means for indicating that the passenger's seat belt is unfastened if a passenger is in the passenger's seat.

* * * * *